United States Patent
Kang et al.

(10) Patent No.: US 9,989,642 B2
(45) Date of Patent: Jun. 5, 2018

(54) METHOD OF ACQUIRING DEPTH IMAGE AND IMAGE ACQUIRING APPARATUS USING THEREOF

(71) Applicant: SAMSUNG ELECTRONICS CO., LTD., Suwon-si (KR)

(72) Inventors: Byongmin Kang, Yongin-si (KR); Dokyoon Kim, Seongnam-si (KR); Keechang Lee, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 864 days.

(21) Appl. No.: 14/504,741

(22) Filed: Oct. 2, 2014

(65) Prior Publication Data
US 2015/0334376 A1    Nov. 19, 2015

(30) Foreign Application Priority Data
May 19, 2014    (KR) ........................ 10-2014-0059964

(51) Int. Cl.
| | |
|---|---|
| H04N 13/02 | (2006.01) |
| G01S 17/89 | (2006.01) |
| G01S 7/486 | (2006.01) |
| G01S 17/36 | (2006.01) |
| G01S 7/491 | (2006.01) |
| G01S 7/493 | (2006.01) |

(52) U.S. Cl.
CPC ............ *G01S 17/89* (2013.01); *G01S 7/4865* (2013.01); *G01S 7/493* (2013.01); *G01S 7/4914* (2013.01); *G01S 17/36* (2013.01); *H04N 13/0271* (2013.01)

(58) Field of Classification Search
CPC ........ G01S 17/36; G01S 17/89; G01S 7/4914; G01S 7/4865; G01S 7/493; H04N 13/0271
USPC .......................................................... 348/46
See application file for complete search history.

(56) References Cited

U.S. PATENT DOCUMENTS

| | | | |
|---|---|---|---|
| 7,791,715 B1 * | 9/2010 | Bamji ...................... | G01C 3/08 356/4.01 |
| 8,223,215 B2 | 7/2012 | Oggier et al. | |
| 9,584,790 B2 * | 2/2017 | Barsoum ............ | H04N 13/0018 |
| 2012/0098935 A1 | 4/2012 | Schmidt et al. | |
| 2012/0098964 A1 | 4/2012 | Oggier et al. | |

FOREIGN PATENT DOCUMENTS

| | | |
|---|---|---|
| KR | 2011-0011244 A | 2/2011 |
| KR | 10-2012-0123068 | 11/2012 |

* cited by examiner

*Primary Examiner* — Mark Hellner
(74) *Attorney, Agent, or Firm* — Harness, Dickey & Pierce, P.L.C.

(57) ABSTRACT

A method of acquiring a depth image and an image acquiring apparatus. The method of acquiring the depth image includes receiving a plurality of phase images with respect to a subject, the plurality of phase images having phases different from one another, eliminating noise from the plurality of phase images, and acquiring the depth image with respect to the subject utilizing the plurality of phase images from which noise has been eliminated.

20 Claims, 7 Drawing Sheets

METHOD OF ACQUIRING DEPTH IMAGE AND IMAGE ACQUIRING APPARATUS USING THEREOF

CROSS-REFERENCE TO RELATED APPLICATIONS

This application claims the benefit of Korean Patent Application No. 10-2014-0059964, filed on May 19, 2014, in the Korean Intellectual Property Office, the disclosure of which is incorporated herein in its entirety by reference.

BACKGROUND

1. Field

Example embodiments relate to a method of acquiring a depth image and an image acquiring apparatus using the method.

2. Description of the Related Art

As a method of acquiring a depth image of a subject, a ToF (time of flight) method utilizes a return time of an infrared ray after irradiating a subject with the infrared ray. ToF cameras adopting this method have an advantage in generating real-time depth images at whole pixels of the subject compared to other conventional cameras such as stereo cameras and structured light cameras for acquiring depth images of the subject.

A depth image may be acquired by the ToF method by using a phase difference between irradiation beams irradiating the subject and reflection beam of the irradiation beams reflected from the subject. The depth image acquired by this method may have noise, and thus studies have been performed to eliminate such noise.

SUMMARY

Provided are a method of eliminating noise in acquiring a depth image and an image acquiring apparatus.

Additional aspects will be set forth in part in the description which follows and, in part, will be apparent from the description, or may be learned by practice of the presented example embodiments.

According to an aspect of example embodiments, a method of acquiring a depth image includes receiving a plurality of phase images with respect to a subject, the plurality of phase images having phases different from one another, eliminating noise from the plurality of phase images, and acquiring the depth image with respect to the subject utilizing the plurality of phase images from which noise has been eliminated.

The eliminating of the noise from the plurality of phase images may include eliminating the noise from at least one of the plurality of phase images.

The eliminating of the noise from the plurality of phase images may include eliminating the noise from a difference image between two phase images among the plurality of phase images.

The two phase images may have a phase difference of 180° therebetween.

The eliminating of the noise from the plurality of phase images may include utilizing at least one of a Gaussian filter, an average filter, a median filter, and a bilateral filter.

The plurality of phase images may include N images, N is an integer greater than or equal to 2, and a phase difference between adjacent phase images among the plurality of phase images may be 360°/N.

The method may further including sequentially irradiating the subject with a plurality of irradiation beams, detecting a plurality of reflection beams reflected from the subject, the plurality of reflection beams corresponding to the plurality of irradiation beams, and acquiring the plurality of phase images by utilizing the detected plurality of reflection beams.

The plurality of reflection beams may have phases different from one another.

The plurality of reflection beams may be modulated with gain waveforms different from one another.

According to another aspect of example embodiments, an image acquiring apparatus includes a noise eliminator eliminating noise from a plurality of phase images, the plurality of phase images having phases which are different from one another with respect to a subject; and an image pickup unit acquiring a depth image with respect to the subject by utilizing the plurality of phase images from which noise has been eliminated.

The noise eliminator may eliminate noise from at least one phase image among the plurality of phase images.

The noise eliminator may eliminate noise from a difference image between two phase images among the plurality of phase images.

The two phase images may have a phase difference of 180° therebetween.

The noise eliminator may eliminate the noise from the plurality of phase images by utilizing at least one of a Gaussian filter, an average filter, a median filter, and a bilateral filter.

The plurality of phase images may include N images, N is an integer greater than or equal to 2, and a phase difference between adjacent phase images among the plurality of phase images may be 360°/N.

The apparatus may further include an image sensor acquiring the plurality of phase images by detecting a plurality of reflection beams which are reflected from the subject.

The image sensor may optically modulate the plurality of reflection beams with gain waveforms different from one another.

The apparatus may further include a light source sequentially irradiating the subject with a plurality of irradiation beams.

The plurality of irradiation beams may have phases different from one another.

According to another aspect of example embodiments, a method of acquiring a depth image includes removing noise, by way of a processor, from a plurality of phase images that are out of phase with each other and acquiring the depth image utilizing the plurality of phase images from which the noise has been removed.

According to another aspect of example embodiments, a method of acquiring a depth image includes removing noise, by way of a processor, from a difference image between two phase images from among a plurality of phase images that are out of phase with each other and acquiring the depth image utilizing the difference image from which the noise has been removed.

BRIEF DESCRIPTION OF THE DRAWINGS

These and/or other aspects will become apparent and more readily appreciated from the following description of the embodiments, taken in conjunction with the accompanying drawings in which:

FIG. 2B is a graph showing a phase value of each pixel of a phase image which the depth image of FIG. 2A is based on;

DETAILED DESCRIPTION

Figure 1:
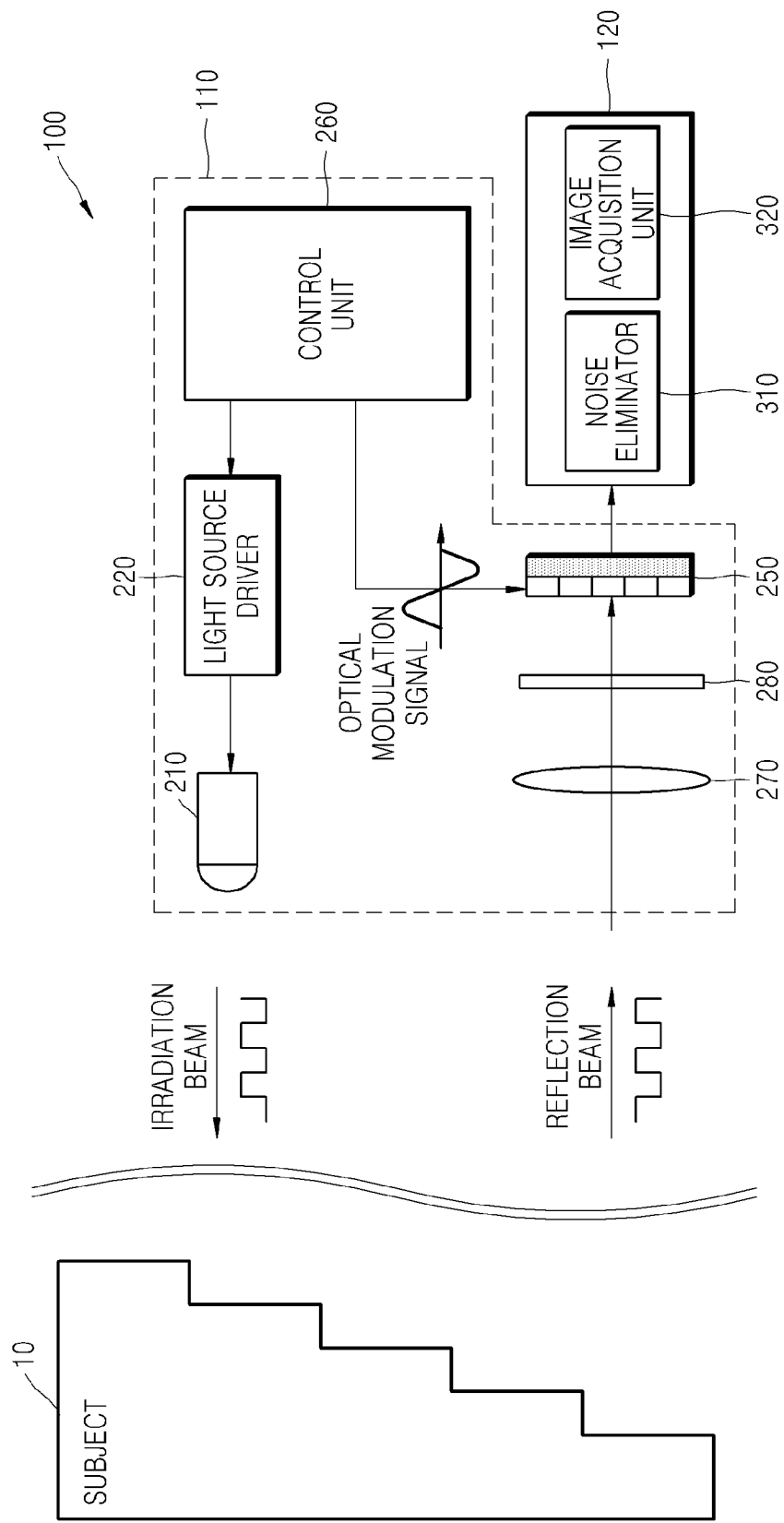
FIG. 1 is a block diagram showing an image acquiring apparatus according to example embodiments.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

It should be understood that example embodiments described therein should be considered in a descriptive sense only and not for purposes of limitation. Descriptions of features or aspects within each embodiment should typically be considered as available for other similar features or aspects in other embodiments.

While example embodiments have been described with reference to the figures, it will be understood by those of ordinary skill in the art that various changes in form and details may be made therein without departing from the spirit and scope of the present invention as defined by the following claims.

Example embodiments relate to the method of decreasing noise of the depth image and the image processing apparatus using the method, and the image acquiring apparatus. Among technology related to example embodiments, a detailed description of technology that is well known to one of ordinary skill in the art is omitted.

FIG. 1 is a block diagram showing an image acquiring apparatus 100 according to example embodiments.

Referring to FIG. 1, the image acquiring apparatus 100 may include an image pickup unit 110 and a signal processor 120 which performs a signal processing on picked-up image signals.

The image pickup unit 110 may include a light source 210 for irradiating a subject 10 with a beam, a light source driver 220 for driving the light source 210, an image sensor 250 for acquiring an image by detecting a reflection beam corresponding to an irradiation beam reflected from the subject 10, and a control unit 260 for controlling an operation of a light source driver 220 and the image sensor 250. A first lens 270 for focusing the reflected beam onto an area of the image sensor 250 and a filter 280 for transmitting a beam having a predetermined wavelength and filtering out background radiation, etc., may be further disposed on a surface of the image sensor 250 on which light is incident.

The light source 210 may be a light emitting diode (LED) or a laser diode (LD) which emit beam having a near infrared ray (NIR) wavelength of about 850 nm, which is invisible to the naked eye. However, the light source 210 and the wavelength of the beam emitted by the light source 210 are not limited thereto. The light source driver 220 may drive the light source 210, for example, in an amplitude modulation or a phase modulation according to a control signal received from the control unit 260. According to a driving signal of the light source driver 220, a light irradiation signal which is emitted from the light source 210 and used to irradiate the subject 10 may have a form of a periodic continuous function having a predetermined period. For example, the light irradiation signal may have a specially defined wave such as a sine wave, a ramp wave, a rectangular wave, etc., and optionally, the light irradiation signal may have a waveform which is not generally defined.

The image sensor 250 may modulate a reflection beam, which corresponds to an irradiation beam reflected from the subject 10, according to a control signal received from the control unit 260. For example, the image sensor 250 may use an optical modulation signal having a predetermined waveform, which is supplied from the control unit 260, to modulate the reflection beam and thereby change the amplitude thereof. For this purpose, the image sensor 250 may have a variable gain. The image sensor 250 may operate at a high optical modulation speed of several tens to several hundreds of MHz to distinguish phase differences of lights or flight time of lights according to distance between the image sensor 250 and the subject 10. For this purpose, the image sensor 250, for example, may include a phase image intensifying tube having a multi-channel plate (MCP), a solid-state modulator device based on GaAs, a thin modulator device using an electro-optic material, etc.

The image sensor 250 may acquire an image from a detected reflection beam. In a case of measuring a distance from the image sensor 250 to one point of the subject 10, the image sensor 250 may include, for example, a single optical sensor such as a photo diode or an integrator. However, in a case of simultaneously measuring distances from the image sensor 250 to multiple points of the subject 10, the image sensor 250 may include a two-dimensional array or a one-dimensional array of photo diodes or other optical detectors. For example, the image sensor 250 may be a charge-coupled device (CCD) image sensor or a CMOS image sensor (CIS) having a two-dimensional array.

The image processing apparatus 120 may acquire a depth image based on outputs of the image sensor 250. The image processing apparatus 120 may be realized by a specific integrated circuit (IC), an application specific integrated circuit (ASIC), or software installed in the image acquiring apparatus 100. When realized by the software, the software may be stored in a separate portable recording medium.

Hereinafter, an operation of the image acquiring apparatus 100 will be schematically explained. First, the light source 210 may sequentially emit a plurality of beams having a predetermined period and a predetermined waveform according to control by the control unit 260. The plurality of beams may be different from one another in terms of period and waveform. The light source 210 may continuously and sequentially emit the plurality of beams, alternately, the light source 210 may sequentially emit the plurality of beams according to a predetermined time interval.

For example, in a case of using four different irradiation beams, the light source 210 may generate a first irradiation beam and irradiate the subject 10 with the first irradiation beam for a time period T1, and generate a second irradiation beam and irradiate the subject 10 with the second irradiation beam for a time period T2, and generate a third irradiation beam and irradiate the subject 10 with the third irradiation beam for a time period T3, and generate a fourth irradiation beam and irradiate the subject 10 with the fourth irradiation beam for a time period T4. The irradiation beams may have a waveform having a continuous function and a specific period, such as a sine wave or a pulse wave. For example, the first through the fourth irradiation beams may be periodic waves which have the same period and same waveform as one another but differ in phase.

In a case in which the number of irradiation beams is N (where N is an integer greater than or equal to 2), a phase difference between adjacent irradiation beams may be 360°/N, and a period of each irradiation beam may be less than an operating time of the light source 210. Within the operating time of the light source 210, all N irradiation beams may sequentially irradiate the subject 10.

The irradiation beam irradiating the subject 10 may be reflected by a surface of the subject 10, and input into the lens 270. Generally, the subject 10 may have a plurality of surfaces, each of which are respectively spaced apart from the image acquiring apparatus 100 by different distances, that is, the surfaces may respectively have different depths. In FIG. 1, the subject 10 has five surfaces having different depths from one other. For example, a first irradiation beam is reflected by one or more of the five surfaces of the subject 10, thereby resulting in the generation of a first reflection beam, a second irradiation beam is reflected by one or more of the five surfaces of the subject 10, thereby resulting in the generation of a second reflection beam, and an Nth irradiation beam is reflected by a specific integrated circuit (IC) the five surfaces of the subject 10, thereby resulting in the generation of an Nth reflection beam.

The lens 270 may focus the reflection beam on an area of the image sensor 250. The filter 280 may be disposed between the lens 270 and the image sensor 250 to transmit light including a predetermined wavelength and to remove ambient light such as a background light, etc. For example, in one case the light source 210 radiates light having an NIR wavelength of about 850 nm, the filter 280 may be a NIR band pass filter which passes light having the NIR wavelength band of about 850 nm. Thus, incident light onto the image sensor 250 is mainly made up of light which in emitted from the light source 210 and reflected from the subject 10 However, ambient light may be included in the incident light. In FIG. 1, the filter 280 is disposed between the lens 270 and the image sensor 250. However, the lens 270 and the filter 280 may be interchanged with each other. For example, NIR light passing through the filter 280 may be focused on the image sensor 250 by the lens 270.

Then, the image sensor 250 may modulate the reflected light and thereby generate an optical modulation signal having a predetermined waveform. A period of a gain waveform may be the same as a period of an irradiation beam waveform. In the example of FIG. 1, the image sensor 250 may modulate the first reflection beam corresponding to the irradiation beam reflected from the subject 10 and provide the modulated reflection beam to the image sensor 250. Thereafter, the image sensor 250 may sequentially modulate the second reflection beam through the Nth reflection beam and provide the modulated reflection beams to the image sensor 250. The reflection beams may be received by the image sensor 250 and an intensity of the reflection beams may be modulated by multiplying the optical modulation signal to the intensity of the received reflection beams. The period of the optical modulation signal may be the same as that of the irradiation beam.

The image sensor 250 may acquire an image with respect to each reflection beam by receiving the amplitude-modulated beam for a predetermined time period. For example, the image sensor 250 may acquire a first image by receiving the first modulated reflection beam, which is reflected by the subject 10 and modulated, for a predetermined exposure time period. Thereafter, the image sensor 250 acquires a second image by receiving the second modulated reflection beam, which is reflected by the subject 10 and modulated, for a predetermined exposure time period. By repeating these processes, the image sensor 250 may acquire an Nth image by receiving the Nth modulated reflection beam, which is reflected by the subject 10 and modulated, for a predetermined exposure time period. The image sensor 250 may sequentially acquire N images including first through Nth different images which are different from one another. Each of the acquired N images may be a sub-frame image which constitutes, a single frame image having depth information. The N images may have different phases from one another, and each of the N images may hereinafter be referred to as a phase image.

Until now, a method of acquiring N phase images using N different irradiation beams has been explained. However, N different phase images may be acquired by the image sensor 250, in which the same irradiation beam is used and the image sensor 250 modulates reflection beams by using different gain waveforms. The different gain waveforms may have different phases from one another.

For example, the image sensor 250 modulates the reflected light with a first optical modulation signal, modulates the reflected light with a second optical modulation signal which is different from the first optical modulation signal, and modulates the reflected light with an Nth optical modulation signal. Here, the first through Nth optical modulation signals may be completely different waveform signals from one another. However, the first through Nth optical modulation signals may have the same period and waveform as one another but have different phases. In this way, the image sensor 250 may acquire first through Nth phase images which are different from one another.

The plurality of phase images having different phases from one another may be acquired by modulating irradiation beams or modulating reflection beams. When there are N phase images, a phase difference between adjacent phase images may be 360°/N. For example, the image sensor 250 may acquire four phase images having 0°, 90°, 180°, and 270° phase respectively. However, example embodiments are not limited thereto. The image sensor 250 may acquire two or more phase images. A method in which the image sensor 250 acquires a plurality of phase images will be described later.

The signal processor 120 may include a noise eliminator 310 which receives a plurality of phase images from the image sensor 250 and eliminating noise therefrom, and an image acquisition unit 320 which acquires a depth image of the subject 10 by utilizing the plurality of phase images from which noise has been eliminated.

The noise eliminator 310 may eliminate the noise from the plurality of phase images. The noise eliminator 310 may eliminate the noise from each of the plurality of phase images. Alternatively, the noise eliminator 310 may group two phase images from among the plurality of phase images and eliminate noise from a difference image between the two phase images. For example, the noise eliminator 310 may eliminate noise from each of four phase images $Q_{0°}$, $Q_{90°}$, $Q_{180°}$, $Q_{270°}$ which have 0°, 90°, 180°, and 270° phases, respectively. Alternatively, the noise eliminator 310 may eliminate noise from a first difference image $Q_{0°}$-$Q_{180°}$ between a first phase image $Q_{0°}$ having a 0° phase and a third phase image $Q_{180°}$ having a 180° phase and eliminate noise from a second difference image $Q_{90°}$-$Q_{270°}$ between a second phase image $Q_{90}°$ having a 90° phase and a fourth phase image $Q_{270°}$ having a 270° phase. In eliminating the noise, less time is required when using the difference image. The noise eliminator 310 may utilize one of a Gaussian filter, an average filter, a median filter, and a bilateral filter.

The image acquisition unit 320 may acquire a depth image with respect to the subject 10 by utilizing a plurality of phase images from which noise has been eliminated. The image acquisition unit 320 may acquire the depth image based on Equation 1 shown below.

$$\text{Depth} = \tan^{-1}\left(\frac{Q'_{90°} - Q'_{270°}}{Q'_{0°} - Q'_{180°}}\right) \times R_{max} \quad [\text{Equation 1}]$$

Here, $R_{max}$ denotes a maximum distance from the image sensor to the subject 10 from which the image acquiring apparatus 100 can pick up an image, and $R_{max}$ is determined by a modulation wavelength and a speed of an irradiation beam. $Q'_{0°}$, $Q'_{90°}$, $Q'_{180°}$, and $Q'_{270°}$ respectively denote first through fourth phase images from which noise has been eliminated.

Alternatively, the image acquisition unit 320 may acquire a depth image based on Equation 2 shown below.

$$\text{Depth} = \tan^{-1}\left(\frac{(Q_{90°} - Q_{270°})'}{(Q_{0°} - Q_{180°})'}\right) \times R_{max} \quad [\text{Equation 2}]$$

Here, $(Q_{0°}$-$Q_{180°})'$ and $(Q_{90°}$-$Q_{270°})'$ respectively denote first and second difference images from which noise has been eliminated.

The image acquisition unit 320 may acquire a depth image by combining a phase image whose noise has been eliminated and a difference image whose noise has been eliminated. An accuracy of the depth image may be improved by eliminating the noise from a phase image prior to acquiring a depth image.

Figure 2A:
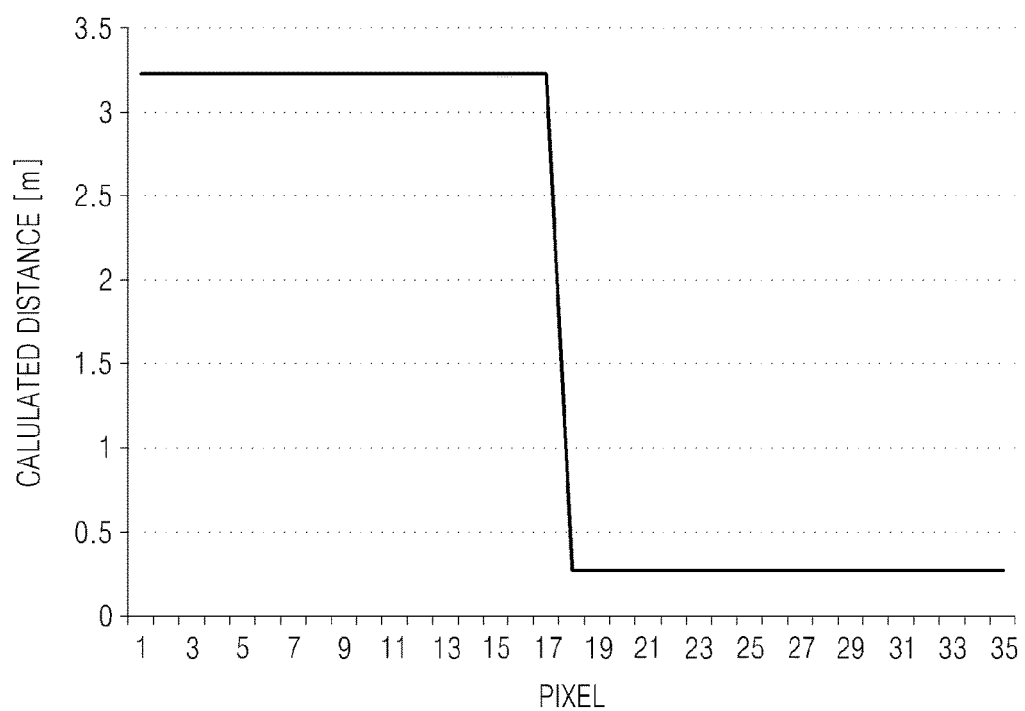
FIG. 2A is a graph showing a depth value of each pixel in an ideal depth image which is applied to a simulation according to example embodiments.
Figure 2B:
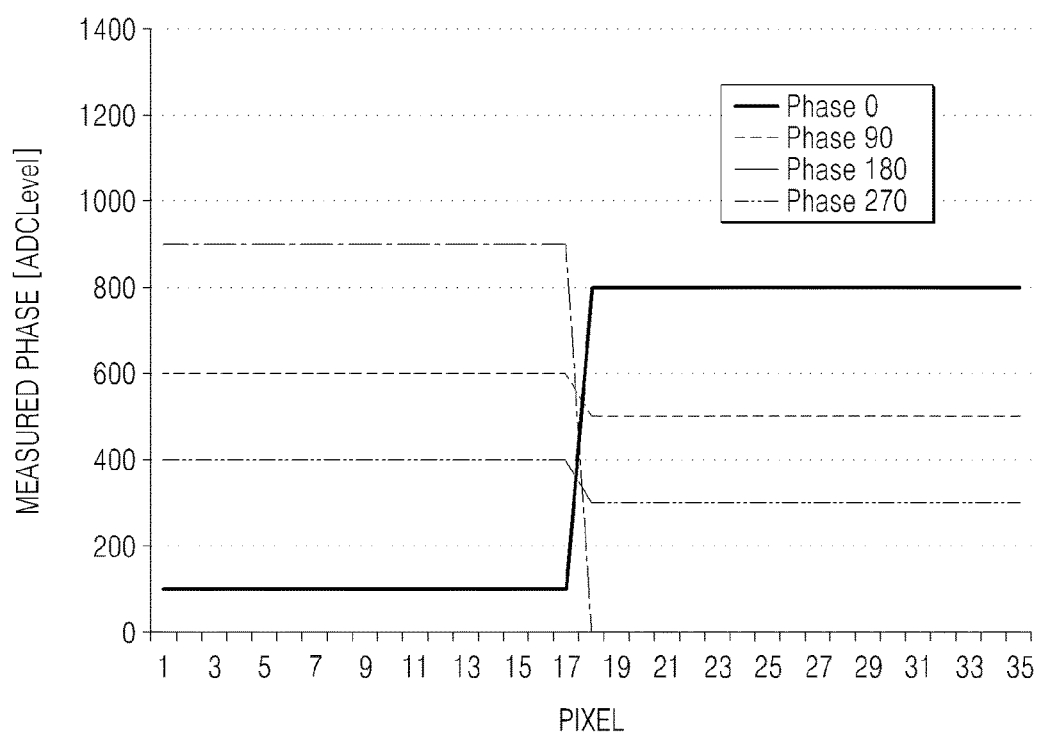
Figure 2C:
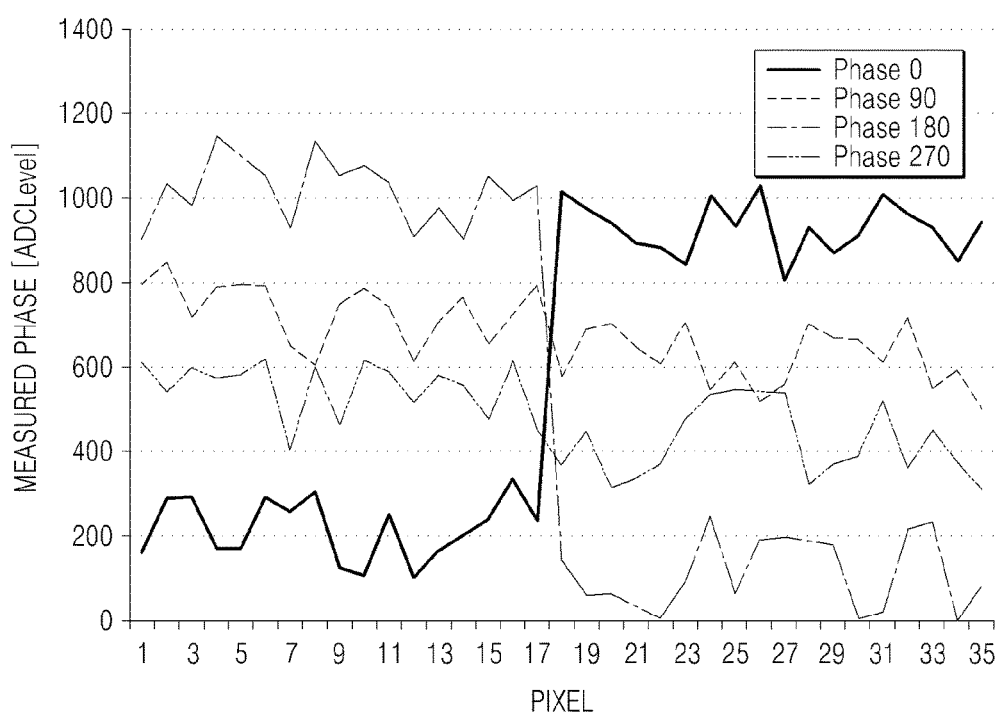
FIG. 2C is a graph showing a phase image of FIG. 2B in which noise has been included.
Figure 2D:
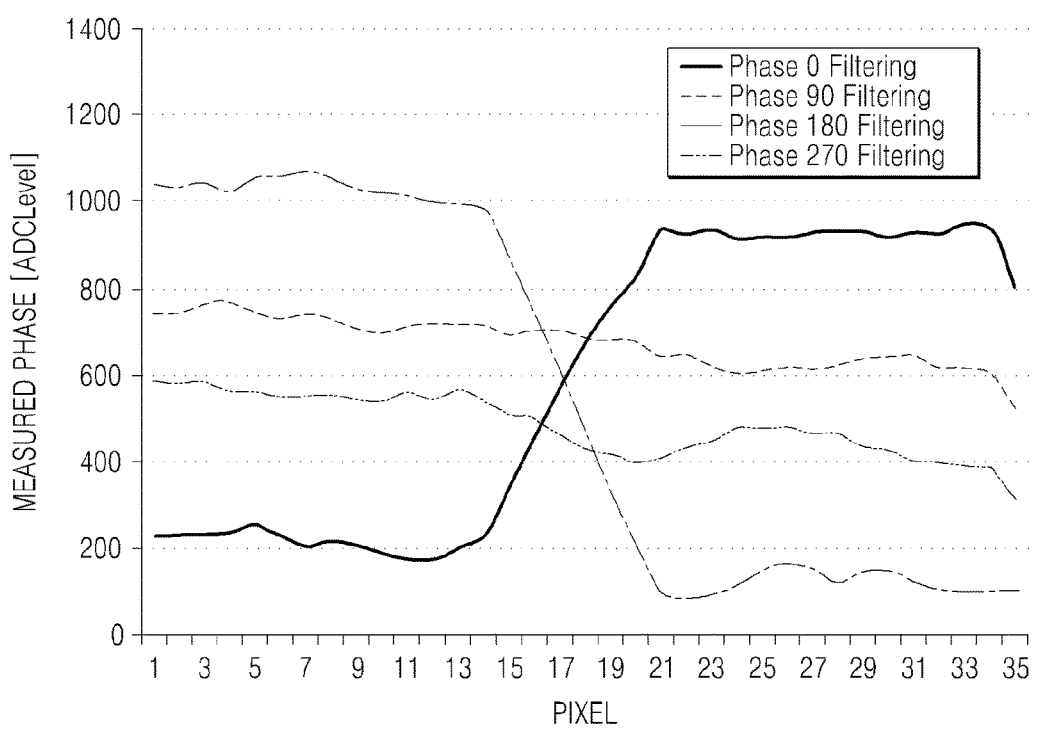
FIG. 2D is a graph showing a phase image of FIG. 2C from which noise has been eliminated by using a Gaussian filter.
Figure 2E:
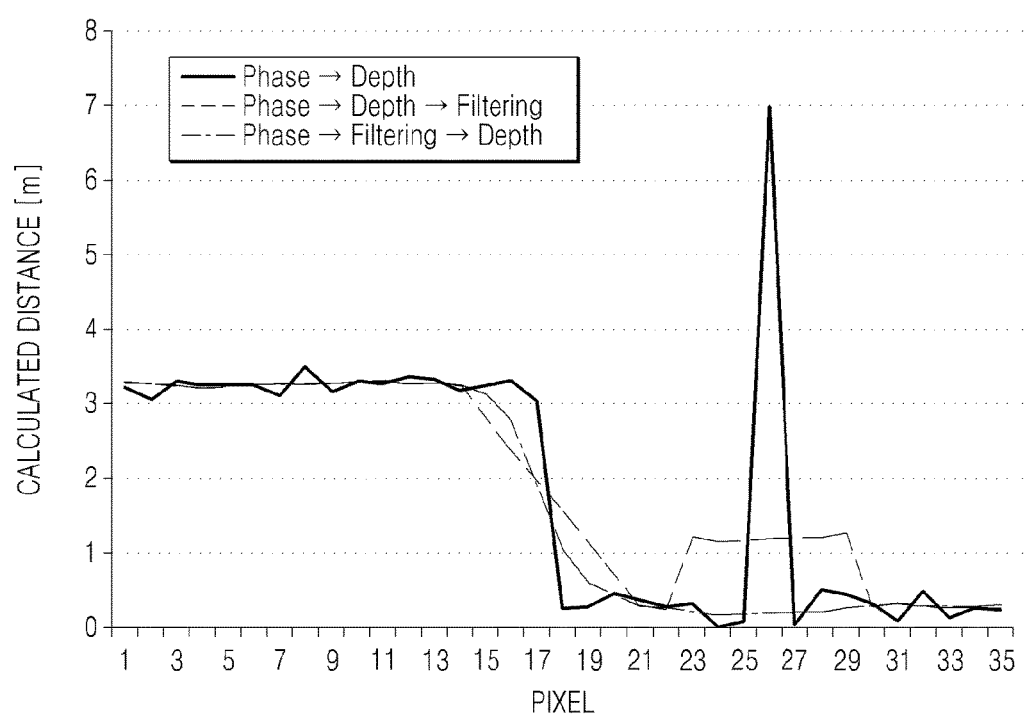
FIG. 2E is a graph explaining an accuracy of depth images according to noise elimination.

Hereinafter, the accuracy of an image according to elimination of the noise will be described utilizing simulation results. FIG. 2A is a graph showing a depth value of each pixel in an ideal depth image. As shown in FIG. 2A, there is a depth difference between pixels, beginning at the 18$^{th}$ pixel. FIG. 2B is a graph showing a phase value of each pixel of a phase image which the depth image of FIG. 2A is based on. There are four phase images which the depth image of FIG. 2A is based on, and the four phase images have 0°, 90°, 180°, and 270° phases, respectively. As shown in FIG. 2C, noise is included in the four phase images. FIG. 2D is a graph showing a result of eliminating noise from the four phase images of FIG. 2C by utilizing a Gaussian filter. FIG. 2E is a graph explaining accuracy of images according to noise elimination. In FIG. 2E, curve ① is a depth image acquired by using the four phase images. Curve ② is a a depth image acquired by using the four phase images to calculate a depth image, followed by eliminating noise from the calculated depth image using a Gaussian filter. Curve ③ is a result of a depth image acquired by eliminating respective noise from each of the four phase images by using a Gaussian filter, and then calculating the depth image by utilizing the four phase images from which noise has been eliminated. As shown in FIG. 2E, accuracy of an acquired depth image is improved by eliminating the noise prior to acquiring a depth image.

Figure 3:
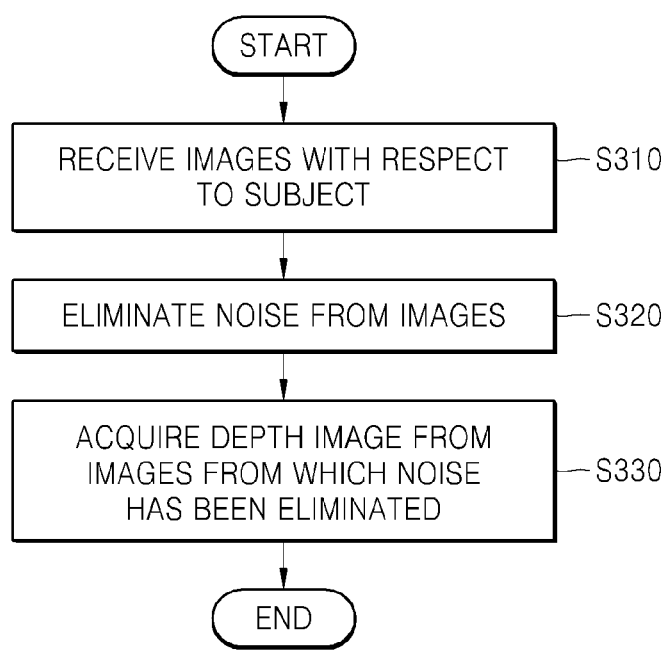
FIG. 3 is a flowchart which explains a method of acquiring a depth image according to example embodiments.

FIG. 3 is a flowchart which explains a method of acquiring a depth image according to example embodiments.

The signal processor 120 receives a plurality of phase images with respect to the subject 10 from the image pickup unit 110 (S310). The plurality of phase images are different from one another. The light source 210 of the image pickup unit 110 may sequentially irradiate a subject 10 with a plurality of irradiation beams, and the image sensor 250 of the image pickup unit 110 may optically modulate a plurality of reflection beams, which correspond to the plurality of irradiation beams that are reflected from the subject 10, and acquire a plurality of phase images from the plurality of modulated reflection beams.

For example, the light source 210 may irradiate the subject 10 with a plurality of irradiation beams which have different phases from one another. The image sensor 250 may modulate the reflection beams with the same gain waveform and acquire a plurality of phase images whose phases are different from one another. In a case in which there are N images (N is an integer greater than or equal to 2), a phase difference between adjacent phase images among the plurality of phase images may be 360°/N. Here, the adjacent phase images means images which are acquired at adjacent time.

The noise eliminator 310 of the signal processor 120 may eliminate noise from the plurality of phase images (S320). The noise eliminator 310 may eliminate noise from at least one of the plurality of phase images. As another example, the noise eliminator 310 may eliminate noise from each of the plurality of phase images. Alternatively, the noise eliminator 310 may eliminate noise from a difference image between two phase images among the plurality of phase images. In this case, a phase difference between the phase images may be 180°. For example, in a case in which the plurality of phase images are phase images having 0°, 90°, 180°, and 270° phases respectively, the noise eliminator 310 may eliminate noise from a first difference image between a first phase image having 0° phase and a third phase image having a 180° phase. The noise eliminator 310 may utilize one of a Gaussian filter, an average filter, a median filter, and a bilateral filter.

Finally, the image acquisition unit 320 may acquire a depth image with respect to the subject 10 by utilizing a plurality of phase images from which noise has been eliminated (S330).

On the other hand, the method of eliminating noise from the phase images and acquiring the depth image described above according to example embodiments can be implemented as a computer program, and can also be implemented through general computer operating the program using a computer-readable medium.

Examples of computer-readable media or processor-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer or processor using an interpreter.

The described hardware devices may also be configured to act as one or more software modules in order to perform the operations of the above-described embodiments. The method of acquiring a depth image may be executed on a general purpose computer or processor or may be executed on a particular machine such as the network connection system or USB input/output server device described herein. Any one or more of the software modules described herein may be executed by a dedicated processor unique to that unit or by a processor common to one or more of the modules.

It should be understood that example embodiments described therein should be considered in a descriptive sense only and not for purposes of limitation. Descriptions of features or aspects within each embodiment should typically be considered as available for other similar features or aspects in other embodiments. While example embodiments have been described with reference to the figures, it will be understood by those of ordinary skill in the art that various changes in form and details may be made therein without departing from the spirit and scope of the present inventive concept as defined by the following claims.

What is claimed is:

1. A method of acquiring a depth image, the method comprising:
   receiving a plurality of sub-frame images with respect to a subject, the plurality of sub-frame images having phases different from one another;
   eliminating, by way of a processor, noise from the plurality of sub-frame images; and
   acquiring the depth image as a single frame image with respect to the subject utilizing the plurality of sub-frame images from which noise has been eliminated.

2. The method of claim 1, wherein the eliminating of the noise from the plurality of sub-frame images comprises eliminating noise from at least one of the plurality of sub-frame images.

3. The method of claim 1, wherein the eliminating of the noise from the plurality of sub-frame images comprises eliminating noise from a difference image between two sub-frame images among the plurality of sub-frame images.

4. The method of claim 3, wherein the two sub-frame images have a phase difference of 180° therebetween.

5. The method of claim 1, wherein the elimination of the noise from the plurality of sub-frame images comprises utilizing at least one of a Gaussian filter, an average filter, a median filter, and a bilateral filter.

6. The method of claim 1, wherein the plurality of sub-frame images includes N images, N is an integer greater than or equal to 2, and a phase difference between adjacent sub-frame images among the plurality of sub-frame images is 360°/N.

7. The method of claim 1, further comprising:
   sequentially irradiating the subject with a plurality of irradiation beams;
   detecting a plurality of reflection beams reflected from the subject, the plurality of reflection beams corresponding to the plurality of irradiation beams; and
   acquiring the plurality of sub-frame images by utilizing the detected plurality of reflection beams.

8. The method of claim 7, wherein the plurality of reflection beams each have phases different from one another.

9. The method of claim 7, wherein the plurality of reflection beams are modulated with gain waveforms different from one another.

10. A non-transitory computer-readable medium having recorded thereon a program, which when executed by a computer, performs the method of claim 1.

11. An image acquiring apparatus, the apparatus comprising:
    a hardware-based processor;
    a noise eliminator configured to eliminate noise from a plurality of sub-frame images, the plurality of sub-frame images having phases which are different from one another with respect to a subject; and
    an image pickup unit configured to acquire a depth image as a single frame image with respect to the subject by utilizing the plurality of sub-frame images from which noise has been eliminated.

12. The image acquiring apparatus of claim 11, wherein the noise eliminator is further configured to eliminates noise from at least one sub-frame image among the plurality of sub-frame images.

13. The image acquiring apparatus of claim 11, wherein the noise eliminator is further configured to eliminates noise from a difference image between two sub-frame images among the plurality of sub-frame images.

14. The image acquiring apparatus of claim 13, wherein the two sub-frame images have a phase difference of 180° therebetween.

15. The image acquiring apparatus of claim 11, wherein the noise eliminator is further configured to eliminates the noise from the plurality of sub-frame images by utilizing at least one of a Gaussian filter, an average filter, a median filter, and a bilateral filter.

16. The image acquiring apparatus of claim 11, wherein the plurality of sub-frame images includes N images, N is an integer greater than or equal to 2, and a phase difference between adjacent sub-frame images among the plurality of sub-frame images is 360°/N.

17. The image acquiring apparatus of claim 11, further comprising: an image sensor configured to acquire the plurality of sub-frame images by detecting a plurality of reflection beams which are reflected from the subject.

18. The image acquiring apparatus of claim 17, wherein the image sensor is further configured to optically modulates the plurality of reflection beams with gain waveforms different from one another.

19. The image acquiring apparatus of claim 17, further comprising: a light source configured to sequentially irradiate the subject with a plurality of irradiation beams.

20. The image acquiring apparatus of claim 19, wherein the plurality of irradiation beams each have phases different from one another.

* * * * *